(12) United States Patent
Harrison et al.

(10) Patent No.: US 11,514,208 B2
(45) Date of Patent: Nov. 29, 2022

(54) RADIO FREQUENCY PROPAGATION SIMULATION TOOL

(71) Applicant: Ordnance Survey Limited, Southampton (GB)

(72) Inventors: Jack Harrison, Southampton (GB); Richard Woodling, Southampton (GB); Bart Chudas, Southampton (GB)

(73) Assignee: Ordnance Survey Limited, Southampton (GB)

( * ) Notice: Subject to any disclaimer, the term of this patent is extended or adjusted under 35 U.S.C. 154(b) by 447 days.

(21) Appl. No.: 16/145,655

(22) Filed: Sep. 28, 2018

(65) Prior Publication Data

US 2019/0102493 A1 Apr. 4, 2019

(30) Foreign Application Priority Data

Sep. 29, 2017 (GB) ...................................... 1715832
Sep. 29, 2017 (GB) ...................................... 1715835

(51) Int. Cl.
*G06F 111/10* (2020.01)
*G06F 30/20* (2020.01)
(Continued)

(52) U.S. Cl.
CPC .............. *G06F 30/20* (2020.01); *G01C 11/00* (2013.01); *H04W 16/22* (2013.01);
(Continued)

(58) Field of Classification Search
CPC .... G06F 30/20; G06F 2111/10; H04W 16/22; H04W 16/18; H04W 24/02; G01C 11/00
(Continued)

(56) References Cited

U.S. PATENT DOCUMENTS 5,949,988 A 9/1999 Feisullin et al.
10,291,339 B2 * 5/2019 Goodbody ......... H04B 17/3913
(Continued)

FOREIGN PATENT DOCUMENTS

GB 2540587 A 1/2017
JP 2013058929 A 3/2013
(Continued)

OTHER PUBLICATIONS

Gougeon et al., "Coupling a deterministic propagation model with diffuse scattering and urban furniture for small cells", 2011, Proceedings of the 5th European Conference on Antennas and Propagation (EUCAP), IEEE, pp. 3448-3452.*
(Continued)

*Primary Examiner* — Juan C Ochoa
(74) *Attorney, Agent, or Firm* — Banner & Witcoff, Ltd.

(57) ABSTRACT

Aspects described herein provide a computer implemented radio frequency propagation simulation tool to allow the simulation of radio frequency propagation across a topographic area which has been very finely mapped in three dimensions to include possible obstructions to high frequency radio waves. A computer implemented RF propagation simulation tool may identify any possible obstructions one edge of which may lie in a simulated RF propagation path between two points, and apply an edge based RF diffraction model (a so-called "knife edge diffraction" model) thereto to simulate the RF propagation around the obstruction. In some aspects, a computer implemented RF propagation simulation tool may identify possible obstructions which in their entirety lie within the width of a simulated RF propagation path, and apply a further diffraction model (a so-called "shield diffraction" model) thereto to simulate the RF propagation around the obstruction. The results of the simulations of RF propagation can be graphi-
(Continued)

cally overlaid onto a map or other topographic image for display to a user.

19 Claims, 6 Drawing Sheets

(51) Int. Cl.
  *G01C 11/00* (2006.01)
  *H04W 16/22* (2009.01)
  *H04W 16/18* (2009.01)
  *H04W 24/02* (2009.01)
(52) U.S. Cl.
  CPC .......... *G06F 2111/10* (2020.01); *H04W 16/18* (2013.01); *H04W 24/02* (2013.01)
(58) Field of Classification Search
  USPC ..................................................... 703/13, 2
  See application file for complete search history.

(56) References Cited

U.S. PATENT DOCUMENTS

| | | | |
|---|---|---|---|
| 10,536,860 B2* | 1/2020 | Pang | H04W 16/18 |
| 2002/0039898 A1* | 4/2002 | Furukawa | H04B 17/391 |
| | | | 455/423 |
| 2009/0167756 A1 | 7/2009 | Bijamov et al. | |

FOREIGN PATENT DOCUMENTS

| | | |
|---|---|---|
| WO | 2007035052 A1 | 3/2007 |
| WO | 2009088666 A1 | 7/2009 |

OTHER PUBLICATIONS

William Mark Smith and Donald C. Cox, Urban Propagation Modeling for Wireless Systems, Jan. 30, 2004, Department of Electrical Engineering, Stanford University, 235 pages.*
Järveläinen et al., "Evaluation of Millimeter-Wave Line-of-Sight Probability With Point Cloud Data", Jun. 2016, IEEE Wireless Communications Letters, vol. 5, Issue 3, pp. 228-231.*
Yves Lostanlen et al., "Ray tracing modeling", 2013, LTE-Advanced and Next Generation Wireless Networks Channel Modelling and Propagation, Wiley, pp. 271-292.*
Corre and Lostanlen, "Three-Dimensional Urban EM Wave Propagation Model for Radio Network Planning and Optimization Over Large Areas", Sep. 2009, Transactions on Vehicular Technologies, vol. 58, No. 7, pp. 3112-3123.*
Propagation data and prediction methods for the planning of short-range outdoor radio communication systems and radio local area networks in the frequency range 300 MHz to 100 GHz, 2013, Recommendation ITU-R p. 1411-1417, 39 pages.*
Motoharu Sasaki et al., "Channel Model Considering Frequency Dependency Based on Propagation Measurements with Multiple Frequencies for 5G Systems", 2016, 22th European Wireless Conference VDE, pp. 15-20.*
Ignacio Rodriguez et al., "Analysis of 38 GHz mmWave propagation characteristics of urban scenarios", 2015, Proceedings of European Wireless, 21th European Wireless Conference VDE, pp. 374-381.*
Dec. 14, 2018—(EP) Extended Search Report—App 18196528.6.
Catedra, et al., "Fast Computer Tool for Analysis of Propagation in Urban Cells," Wireless Communications Conference, 1997, pp. 240-245.
Mar. 15, 2018—(EP) Search Report—App 1715832.0.
Mar. 15, 2018—(EP) Search Report—App 1715835.3.
IEEE Transactions on Vehicular Technology; vol. 62; Issue 2; Feb. 2013; Kin Lien Chee, Saul A. Torrico, Thomas Kumer; "Radiowave Propagation Prediction in Vegetated Residential Environments;" pp. 486-499.
IEEE Proceedings of Wireless Communications Conference; Aug. 11-13, 1997; Catedra M F, Perez J, Gonzalez A, Gutierrez O, Saez de Adana F; "Fast Computer Tool for the Analysis of Propagation in Urban Cells".
James, G.L., Geometrical Theory of Diffraction, IEE, London, 1986.
Wang et al, Attenuation by a Human Body and Trees as well as Material Penetration Loss in 26 and 39?GHz Millimeter Wave Bands International Journal of Antennas and Propagation, vol. 2017 (2017), Article ID 2961090, 8 pages.
Admitted Prior Art—Mitra, A, Lecture Notes on Mobile Communication, Chapter 4, available at: <http://www.iitg.ernet.in/scifac/qip/public_html/cd_cell/chapters/a_mitra_mobile_communication/chapter4.pdf>.
Admitted Prior Art—Pathak, P.H., Uniform Geometrical Theory of Diffraction, available at: <http://www.dtic.mil/get-tr-doc/pdf?AD=ADP005645>.

* cited by examiner

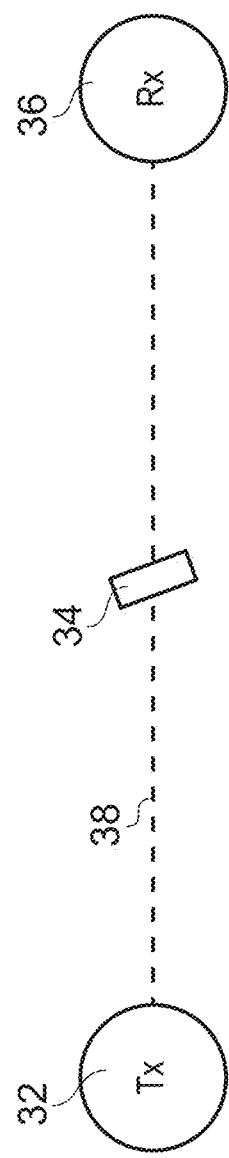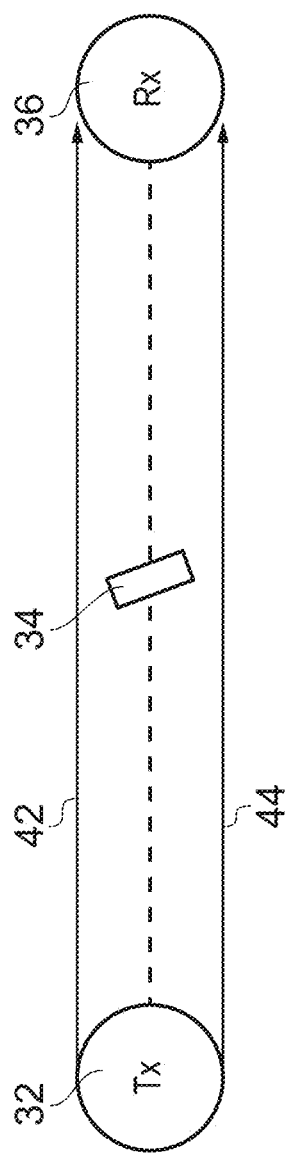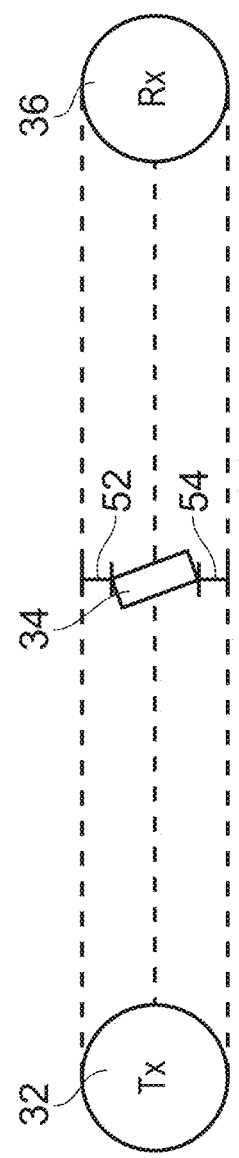

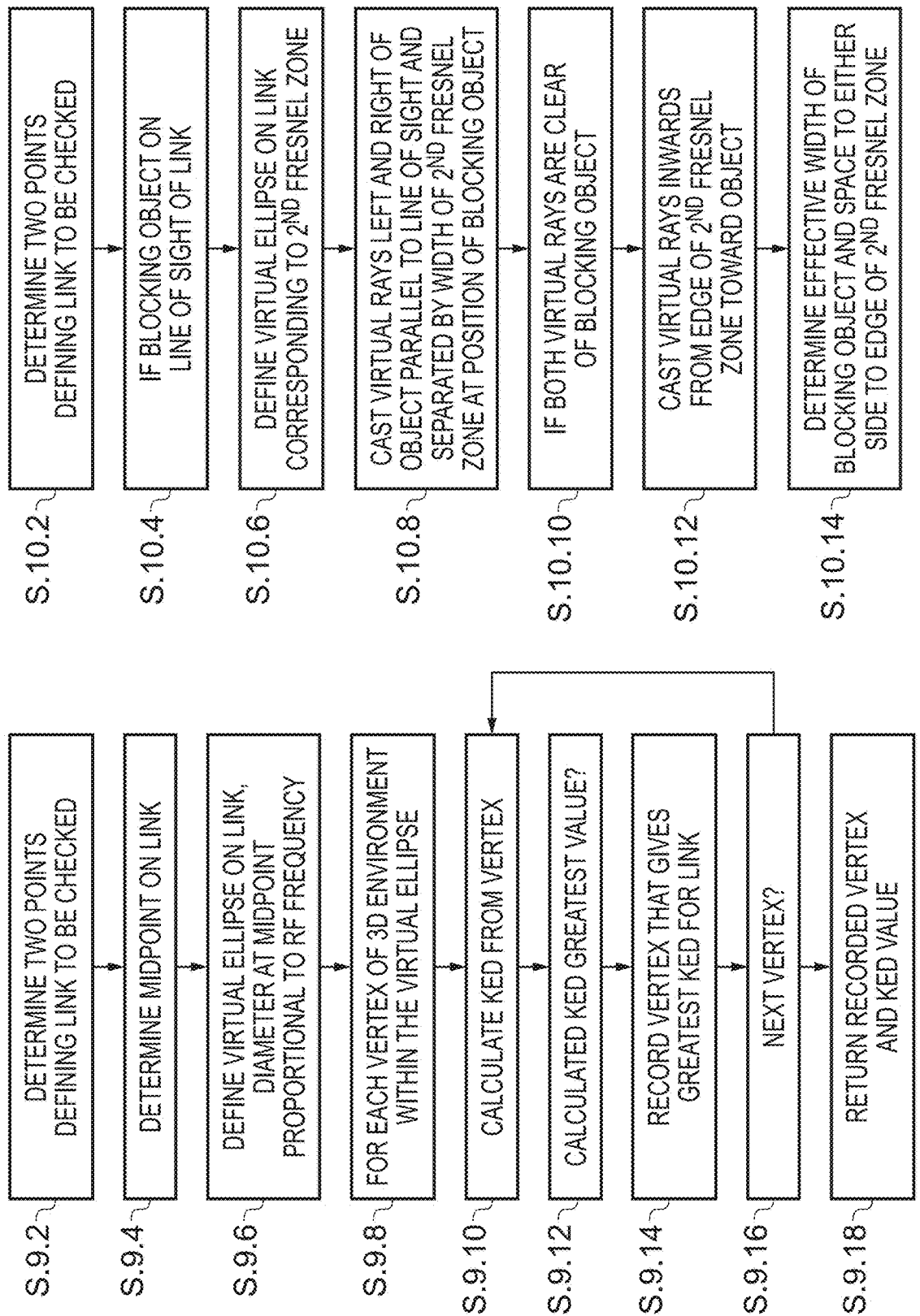

RADIO FREQUENCY PROPAGATION SIMULATION TOOL

TECHNICAL FIELD

Embodiments described herein relate to a computer implemented radio frequency propagation simulation tool for mobile radio network planning purposes, and in particular such a tool that takes into account knife edge diffraction and/or shield diffraction of high frequency radio waves used for mobile telecommunications.

BACKGROUND

When deploying new mobile network base stations it is necessary to plan the location of such base stations carefully with respect to various topographic and user population data in order to provide the intended coverage and quality of service to mobile users. In view of the massive capital expense in deploying a new mobile network, computer implemented RF propagation simulation tools are known that allow for the simulation of the operation of base stations in simulated locations to determine the performance thereof. A brief overview of prior art RF planning operations is available at en.wikipedia.org/wiki/RF_Planning. With previous generation mobile roll-outs, the lower frequencies of operation meant that precise positioning with respect to street furniture and buildings was not that important. However, for forthcoming fifth generation (5G) networks, which will likely operate at predominantly higher frequencies of operation than legacy networks, precise base station positioning is important, as the propagation of high frequency (typically GHz) radio waves that are to be used in 5G can be affected by buildings, but also smaller objects such as street furniture (lampposts, post boxes, signs, etc.) and trees. In order to properly plan a 5G network roll-out, more accurate RF propagation simulation taking into account all objects within the environment needs to be undertaken.

SUMMARY

Embodiments described herein provide a computer implemented radio frequency propagation simulation tool to allow the simulation of radio frequency propagation across a topographic area which has been very finely mapped in three dimensions to include possible obstructions to high frequency radio waves. In particular, in one aspect a computer implemented RF propagation simulation tool is provided that is able to identify any possible obstructions one edge of which may lie in a simulated RF propagation path between two points, and to apply an edge based RF diffraction model (a so-called "knife edge diffraction" model) thereto to simulate the RF propagation that will be obtained around the obstruction. In another aspect a computer implemented RF propagation simulation tool is provided that is able to identify possible obstructions which in their entirety lie within the width of a simulated RF propagation path, and to apply a further diffraction model (a so-called "shield diffraction" model) thereto to simulate the RF propagation that will be obtained around the obstruction. In both examples the results of the simulations of RF propagation can be graphically overlaid onto a map or other topographic image for display to a user.

One example of the present disclosure relates to a computer-implemented method of simulating a radio frequency communications link between simulated transmitter and receiver positions, comprising: a) obtaining geospatial data pertaining to an area in which the transmitter and receiver positions are to be simulated, the geospatial data including information relating to geospatial objects located in the vicinity of the communications link to be simulated; and b) simulating RF communications link propagation characteristics between the simulated transmitter and receiver positions using the geospatial data and an RF propagation model; characterized in that the geospatial data includes overhead imagery data obtained from an overhead survey of the area, and street-level data obtained from a street-level survey of the area, the street-level data including information relating to street-level geospatial objects, the street-level geospatial objects including street furniture and vegetation.

By taking integrating both overhead imagery and street level imagery together, then a more accurate geospatial model is obtained that can be used in the RF simulation. Moreover, unlike with previous generations of mobile technology, where the transmission frequencies were less likely to be affected by vegetation and small objects such as street furniture, when modelling 5G transmissions a better modelling result is obtained if all objects that can adversely affect the 5G signal propagation can be modelled. This includes street furniture and vegetation, and hence the ability to integrate both overhead imagery for bulk objects such as buildings, and street-level imagery for fine resolution (i.e. smaller) objects such as lamp-posts, telegraph poles, signposts, and other street furniture provides significantly improved simulation results than those prior art cases where typically only bulk objects such as buildings are taken into account.

In one example the overhead imagery data is derived from one or more of: i) aerial imagery data; and/or ii) satellite imagery data. In contrast, in an example the street-level data is typically derived from geo-spatial point cloud data obtained from the street-level survey of the area. Such geo-spatial point cloud data is often obtained from vehicle-mounted LIDAR sensors that collect point-cloud data from LIDAR measurements as the vehicle is driven down a street.

In some examples the street furniture may include pole or post mounted street furniture. Such pole or post-mounted street furniture is often the objects that can have the most detrimental effects on the propagation of high-frequency RF signals such as 5G signals, but usually the effects are not included in propagation simulations. However, by using highly detailed street-level models, in combination with the appropriate RF propagation models for post-type objects, examples of the present disclosure are able to identify, locate, and simulate such post-type objects effects on RF propagation in the area of interest.

In example of the present disclosure the pole or post mounted street furniture may include any one or more of: a) lamp-posts; b) sign-posts; c) post-boxes; d) telephone boxes; e) fencing; f) barriers; g) traffic lights; h) telegraph poles; and/or i) traffic signs.

In addition to taking into account street furniture, examples described herein also take into account vegetation in the modelling. This is necessary as most urban streets also include lots of vegetation, which can adversely impact RF propagation characteristics, or at least alter them. The vegetation includes trees, which tend to be the largest examples of vegetation that interfere with RF propagation.

In one example, the simulating further comprises: i) defining a virtual RF propagation area between the simulated transmitter and receiver positions, ii) identifying any objects from the geospatial data which possess at least one vertex located within the defined virtual RF propagation area and which extend beyond the defined virtual RF propagation area; iii) calculating a knife edge diffraction value for the identified objects and the associated vertexes; iv) determining from the respective knife edge diffraction values the greatest such value; and v) calculating the RF communications link propagation characteristics in dependence on the determined knife edge diffraction value. In this example, a particular first type of RF propagation effect known as knife edge diffraction (KED) is modelled. KED occurs from any (particularly conductive) edge which extends into the RF beam-width from one side. This can include various types of street furniture, and particularly wider types such as road signs, trees, and bus shelters.

In a second example, the simulating further comprises: i) defining a virtual RF propagation area between the simulated transmitter and receiver positions, ii) identifying any objects from the geospatial data which are located on a simulated line of sight between the simulated transmitter and receiver positions; iii) determining if any of the identified objects are located wholly within the virtual RF propagation area; iv) for any object determined to be wholly within the virtual RF propagation area, calculating a shield diffraction value for the objects thus determined; and v) calculating the RF communications link propagation characteristics in dependence on the greatest calculated shield diffraction value. In this example shield diffraction effects, where the diffracting object is wholly within the RF beam-width, are modelled. Such RF propagation effects can be modelled on thinner street furniture, such as lamp-posts and the posts of sign posts.

In the above examples the size and shape of the RF propagation area is determined in dependence on the RF frequency being simulated, and in many examples the RF propagation area is in the shape of an ellipse. In terms of size, it has been found that good results can be obtained when the RF propagation area corresponds to the area of the 2nd Fresnel zone between the simulated transmitter and receiver positions.

In further examples, the geospatial data further includes data relating to meteorological conditions in the RF propagation area. Meteorological conditions can affect RF propagation immensely, and hence taking those into account further improves the simulation obtained. The meteorological conditions that are modelled may include the amount of rainfall in the RF propagation area.

Various features and aspects will be apparent from the following description and the appended claims.

DESCRIPTION OF THE FIGURES

Further features and advantages will become apparent from the following description of embodiments and aspects described herein, presented by way of example only, and with reference to the accompanying drawings, wherein like reference numerals refer to like parts, and wherein:

FIGS. 3, 4, 5, and 6 are diagrams illustrating how shield diffraction effects are accounted for in illustrative embodiments;

FIG. 9 is flow diagram illustrating the steps involved in a first illustrative embodiment that allows knife edge diffraction effects to be calculated and applied in an RF planning tool; and FIG. 10 is a flow diagram illustrating the steps involved in a second illustrative embodiment that allows shield diffraction effects to be calculated and applied in an RF planning tool.

DETAILED DESCRIPTION

Aspects described herein provide a computer-implemented radio frequency (RF) propagation simulation tool to allow network planning to be undertaken for the deployment of new mobile networks (for example, planned 5G networks). In particular, embodiments described herein allow for the location of network base stations to be simulated within a particular geographic area, and for the radio propagation characteristics across the area, in terms of point to point link budgets and other RF characteristics, to be calculated across the area in dependence on the simulated base station positions. However, in aspects described herein, extremely detailed 3D topography data of the area is employed, obtained from existing hyper accurate surveys for example undertaken by a national mapping agency, such as the Ordnance Survey of the United Kingdom, United States Geological Survey, and the like. Such surveys may incorporate aerial and satellite image data, as well as data obtained from ground based surveys, such as point-cloud surveys (obtained, for example using vehicle mounted LIDAR systems), and ground based optical imagery. By using such accurate topographic data in the RF planning tool, it then becomes possible to apply known RF propagation theories relating to knife-edge diffraction and shield diffraction in a practical manner to help in the calculation of the RF propagation characteristics from point to point across the area being looked at. Previously, whilst the theoretical basis for knife edge diffraction and shield diffraction was known in the art, such RF propagation characteristics would not usually be included effectively in RF planning tools due to a lack of topographic data of sufficient granularity to allow such physical effects to be properly taken into account at street-level. However, aspects described herein combine extremely detailed topographic data of an area which, for example, shows street furniture such as lampposts, post boxes, signs, barriers, and the like that can cause such diffraction effects, with criteria for applying the known RF propagation models to allow the models to be applied practically in an RF planning tool.

Figure 1:
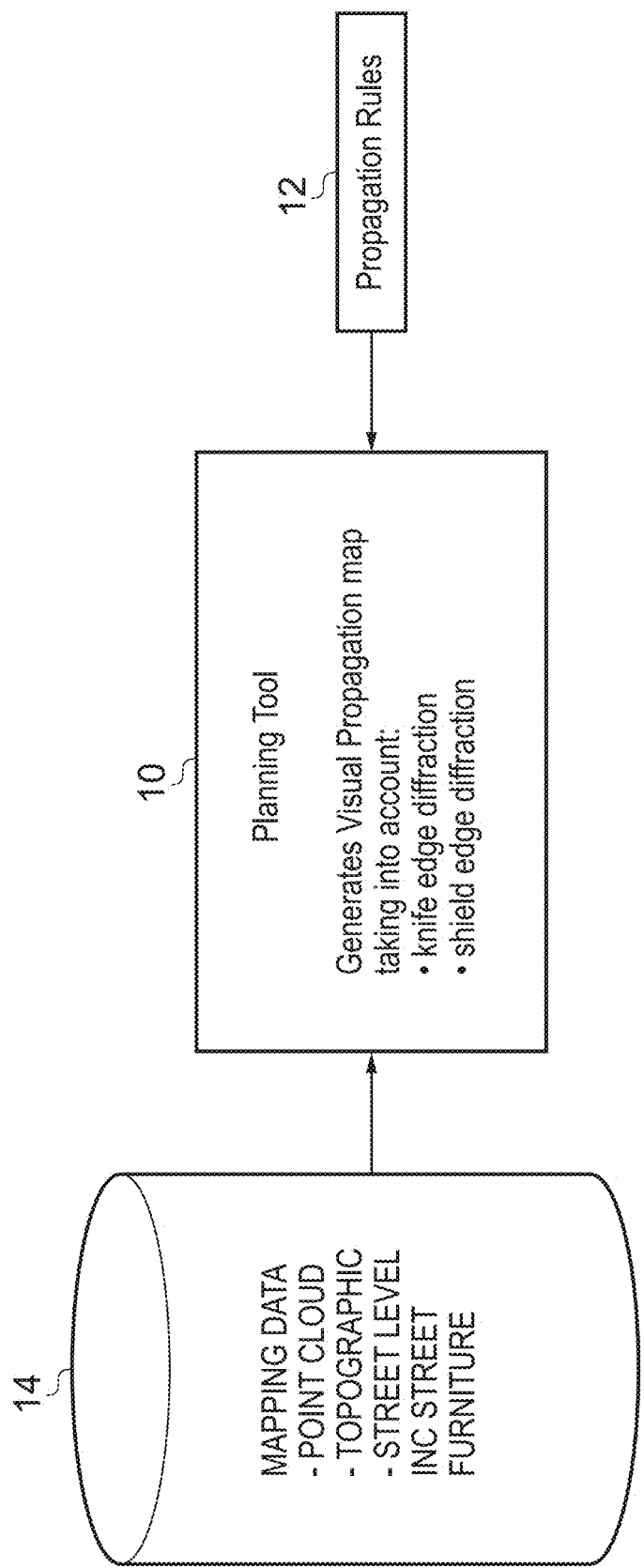
FIG. 1 is a block diagram illustrating an overview of illustrative embodiments.

In more detail, aspects described herein provide an RF planning tool for use in 5G planning that demonstrates the impact of the geospatial environment on small-cell network planning. FIG. 1 illustrates an overview. Here, the planning tool 10 consists of two main parts, the user interface (UI) and the propagation model behind it, with the user interface generating a visual RF propagation map that takes into account both knife edge diffraction and shield diffraction effects, based on predefined and known RF propagation rules 12 for planned RF frequencies and modulations. Used as an input into the tool 10 is very detailed geospatial information 14, obtained from aerial and satellite topographic surveys, as well as street level point cloud surveys, and which incorporates data relating to building size, shape, and positions, as well as the locations and shapes of other topographic features such as street furniture, trees, vegetation, and the like. Such detailed geospatial information is typically (although not exclusively) available from a national mapping agency, such, as in the case of the United Kingdom, the Ordnance Survey.

Figure 2:
FIG. 2 is a screen shot showing the results of the operation of illustrative embodiments.

The UI is shown in FIG. 2, and allows users to position cells, define an area of interest, specify model parameters and run the RF propagation simulation model. As noted, the precise RF propagation simulation models used are beyond the scope of the present disclosure, and have been and continue to be defined by various research consortia and industry bodies, but whichever precise mathematical propagations models are used, such models may be integrated to operate with the geospatial and topographic data available. Aspects described herein provide at least two mechanisms for integrating the theoretical mathematical models with the real-world data in two specific areas relevant to high frequency RF propagation, namely when considering knife-edge diffraction, and also shield diffraction.

Knife and shield diffraction are two different phenomena that affect signal propagation. They are caused by interactions with the geospatial environment, and in order to quantify their impact we need to measure a set of values. In order to simplify the process, we only consider the environmental object with the greatest impact in each case-for example if a signal is impacted by more than one source of knife diffraction, we will only consider the most diffracting object.

Figure 7:
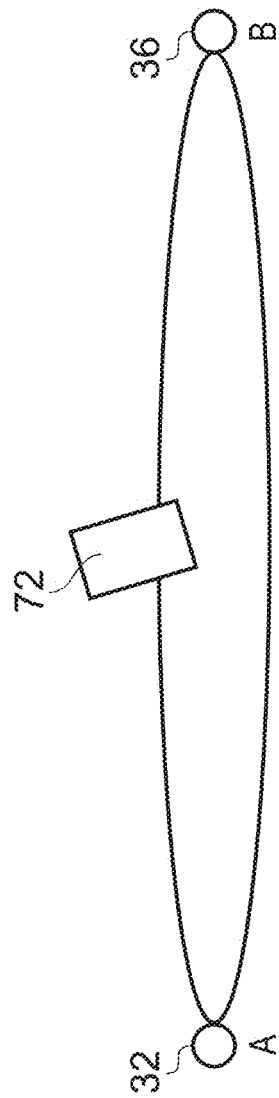
FIG. 7 is a diagram illustrating how knife edge diffraction is accounted for in illustrative embodiments.

Knife diffraction is a function of the proximity of an edge, such as the corner of a building or the side of an advertising hoarding, to the signal path. However, it is also dependent on the position of this edge between the transmitter and receiver. Thus, the closest edge is not always the most diffracting. To account for this, in a first embodiment we first check for potential diffracting edges using a shape such as, for example, an ellipsoid cast against the environment. The diameter of this ellipsoid at the midpoint between the transmitter and receiver is proportional to the signal frequency, and it is then stretched along the signal path. FIG. 7 illustrates an example between simulated transmitter and receiver positions A and B. In some embodiments the ellipsoid is defined by the second Fresnel zone between the simulated transmitter and receiver.

Once the virtual ellipsoid has been defined, each vertex of the 3D environment within this ellipsoid is then evaluated as a potential edge using known knife-edge diffraction formulae. The most diffracting edge is determined, and its distance from the signal path & position between the transmitter and receiver are recorded.

Turning to shield diffraction, shield diffraction is considered when an object actually obstructs the signal path, but is not wide enough to completely block the signal. For example, a lamp post might be sufficiently narrow to permit shield diffraction, resulting in a reduced signal propagation but not completely blocking the signal. In order to determine the impact, we need to calculate the width of the object and its offset from the signal path. To achieve this, we first identify the collision point of the diffracting object and the signal path. From this point, we create two parallel lines to the left and right of the diffracting object, at a distance proportional to the signal frequency. If those two lines are obstructed, then the object is too wide to consider shield diffraction and we simply treat the signal as blocked. If not, then we move the two lines towards the signal path until they collide with the diffracting object. Using the two collision points, we can then calculate the width and offset of the object—which are supplied to the radio frequency planning model to determine its impact.

Using the above techniques the radio planning tool is able to generate a map of the simulated radio propagation characteristics for given simulated RF base station locations, which overlays the propagation (typically signal to noise ratio) characteristics calculated at each point in the area under consideration onto aerial or satellite imagery of the area, so that a user can see the effect of a simulated base station position. FIG. 2 gives an example output image from such a system in accordance with an embodiment.

Further features and advantages will now be discussed.

Figure 8:
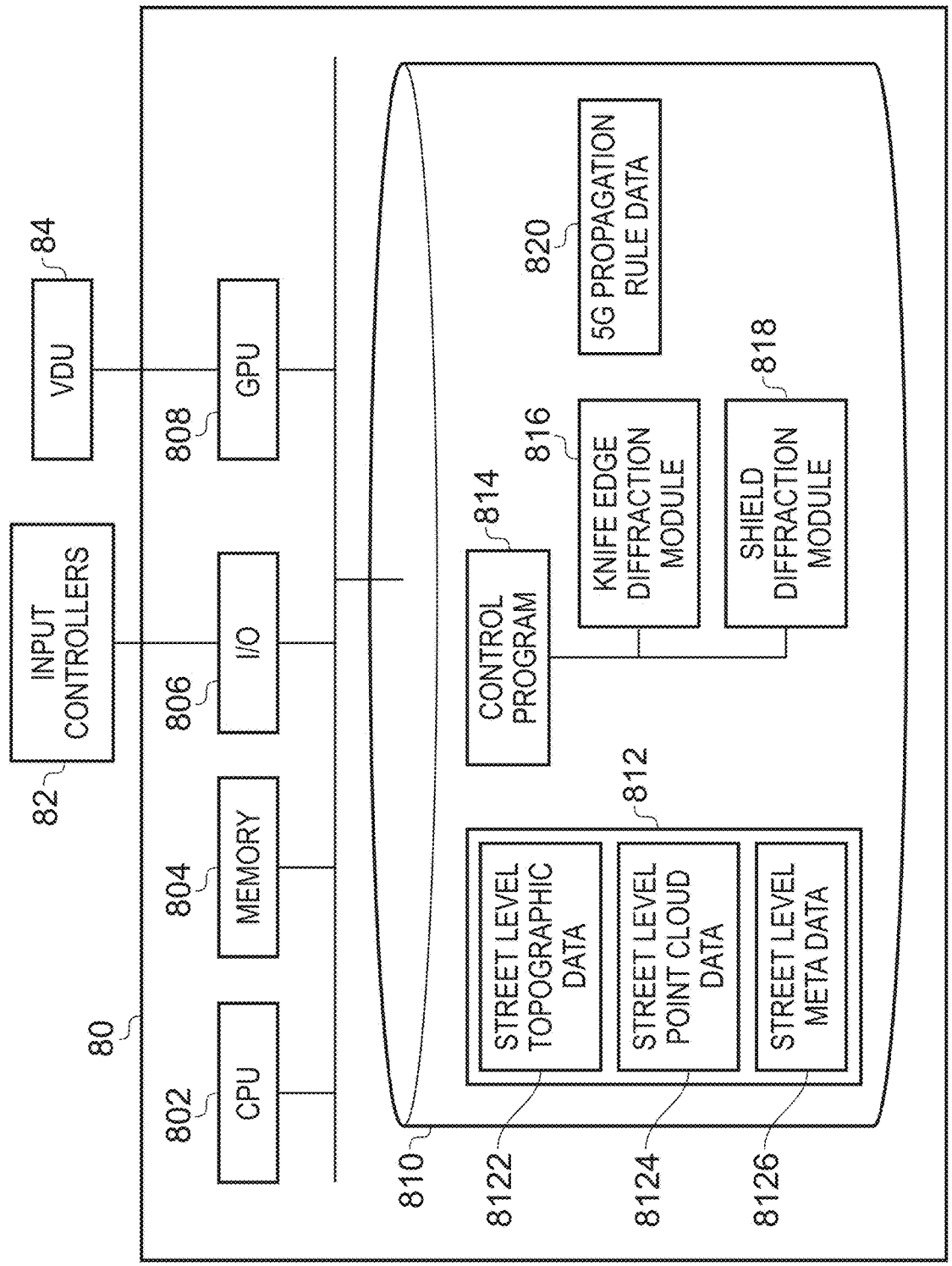
FIG. 8 is a block diagram of an illustrative embodiment.

FIG. 8 is a block diagram of a computer system which provides a platform for aspects described herein. In particular, a general purpose computer system 80 is provided, having a central processing unit (CPU) 802, memory 804, a graphics processing unit (GPU) 808, and input and output (I/O) interfaces 806, all of which are connected by a common bus. Also provided is a computer readable storage medium 810, such as a hard disk drive, flash drive, or the like, upon which is stored a control program 814 which controls a computer generally to perform illustrative aspects and embodiments described herein, and which also controls a knife edge diffraction program module 816, and a shield diffraction program module 818, which individually calculate the knife edge diffraction and shield diffraction properties of simulated data, as to be described. Also included on the computer readable storage medium 810 is RF propagation data, in this case in the form of 5G-frequency (i.e. typically GHz frequencies, for example in the range 1 to 26 GHz, although other frequencies may be defined and become available, depending on country and region) RF propagation rule data 820, which relates to the theoretical mathematical propagation properties of high frequency radio waves, including their diffraction properties. Also provided is accurate geospatial data relating to the area which is to be simulated, in the form of geospatial data 812. Geospatial data 812 further comprises street level topographic data 8122, as well as street level point cloud data 8124, which is integrated with and indexed against the street level topographic data. Street level metadata 8126 is also provided, which provides data ancillary to the topographic data and the point cloud data, such as the co-ordination and alignment therebetween, as well as other properties, such as latitude and longitude, dates at which the data was captured, and the like.

As described previously, the basic operation of an illustrative aspect is to undertake an RF propagation simulation over a specified geographic area for which detailed geospatial data is available, in order to determine point to point RF propagation properties between simulated transmitter and receiver positions that are defined by a user. Such RF planning tools have been known in the art previously, and they apply known RF propagation mathematical models to calculate their output. Aspects described herein differ from prior art arrangements in various ways, including for example by the application of the highly accurate geospatial data 812, in combination with knife edge diffraction and shield diffraction models in order to be able to accurately calculate knife edge diffraction and shield diffraction effects in the RF modelling. Previously such effects were often discounted, other than bulk effects caused, for example, by buildings, because the geospatial data available to the RF planning tool was not accurate enough and did not include data such as street furniture, trees, vegetation, and the like. However, by combining highly accurate geospatial data into the RF planning tool, it then becomes possible to take into account RF propagation effects such as knife edge diffraction and shield diffraction at much higher granularity and with much greater accuracy than heretofore has been possible. The street furniture that can be taken into account includes any post- or pole-mounted street furniture, and includes any of lamp-posts, sign-posts, post-boxes, telephone boxes, fencing, barriers, traffic lights, telegraph poles, and/or traffic signs.

FIG. 9 illustrates the steps involved by the computer system 80 in undertaking a knife edge diffraction calculation between two points A and B at which transmitter 32 and receiver 36 may be simulated as being located, when determining the RF propagation map produced by the RF propagation tool. Firstly, at step 9.2 two points defining the radio link to be simulated are determined. In the context of FIGS. 3 to 6, these are, for example, transmitter position 32 and receiver position 36. In this respect, it will be understood that in order to determine an entire map such as shown in FIG. 2, the RF planning tool iterates between defined transmitter positions and all possible receiver positions for those transmitters, calculating RF link propagation characteristics for each possible link that is possible given the plethora of RF receiver transmissions for a defined set of transmitter positions, as well as possible interference between transmitters where plural transmitter positions are defined. In order to save complication on description, however, in the following we shall concentrate on the processing that is performed when assessing knife edge diffraction and shield diffraction for a single link, it then being understood that the same processing is performed by the tool for every other possible link which is needed to be calculated.

Returning to FIG. 9, having determined the transmitter and receiver points that define the link, at step 9.4 a mid-point is determined on the link. At step 9.6 a shape is then cast against the environment, defined on the link, with the diameter at the mid-point proportional to the RF frequency being used. In this respect, in some embodiments the shape is an ellipse, with the diameter of the virtual ellipse defined at the mid-point being equivalent to the diameter of the second Fresnel zone between the two points A and B that are being checked. This diameter was chosen as one can be fairly sure that anything beyond the 2nd Fresnel zone is likely to have minimal impact. In some embodiments, a different shape to an ellipse may be used to be cast against the environment, and embodiments are not limited to either an ellipse, or that it should have a width equivalent to the 2nd Fresnel zone.

Next, at step 9.8, a processing loop is started, which checks each vertex of the 3D environment that spatially falls within the defined virtual ellipse. For each vertex that is found, a knife edge diffraction value is calculated using known knife edge diffraction calculation principles available, for example, from the 5G Innovation Centre of the University of Surrey. A check is then performed at step 9.12 as to whether the knife edge diffraction value that has been found is the greatest value that had been found so far in the processing, and if so the geospatial vertex that gives the greatest knife edge diffraction value for the link is recorded. This happens at step 9.14. At step 9.16 the processing loop ends, and the next vertex in the 3D environment that is within the defined ellipse is calculated. The results of the processing loop from step 9.8 to step 9.16 are that the 3D vertex within the environment that gives the greatest knife edge diffraction value is found. This vertex is then recorded, together with its knife edge diffraction value, and returned so as to be used in the tool in generating the RF propagation map.

With the above, therefore, it then becomes possible for knife edge diffraction to be taken into account from each significant object in a link path that might affect the signal propagation, including street furniture, lamp posts, trees, and the like. Previous RF planning tools had not been able to take into account such items at the same level of granularity.

Turning now to FIG. 10, the process of calculating shield edge diffraction effects for a link will now be described, further with reference to FIGS. 3 to 6. Again, with shield diffraction, we shall describe the process for calculating shield diffraction on a single link, it being understood that the RF planning tool performs the calculation between each simulated transmitter position, and every possible receiver position, and further taking into account inter-station interference, where multiple transmitters are operating simultaneously.

With respect to FIG. 10, firstly, at step 10.2 the two points defining the link to be checked are determined e.g., the transmitter position 32 and the receiver position 36. A virtual line of sight is then drawn between the transmitter and receiver positions, at step 10.4, and determination is made as to whether a blocking object 34 is present on the line of sight 38 (c.f. FIG. 3). If there is no blocking object on the line of sight of the link, then no further shield diffraction calculations need to be undertaken for the link. However, if there is a blocking object on the line of sight of the link, then a virtual shape is defined between the transmitter and receiver positions on the link, at step 10.6. As with the previous embodiment, the virtual shape may be an ellipse, for example with a width corresponding to the width of the second Fresnel zone between the transmitter and receiver positions, although other shapes with other widths may be used in other embodiments. Then, virtual rays are cast left and right of the blocking object parallel to the line of sight, and separated by the width of the second Fresnel zone, at the position of the blocking object, at step 10.8. This is shown in FIG. 4, wherein virtual rays 42 and 44 are cast at either side of the second Fresnel zone (not shown). In this respect, because the blocking object 34 in FIG. 4 is located at the mid-point between the transmitter 32 and receiver 36, the second Fresnel zone will be at its widest, at this point. Calculation of Fresnel zones for a radio link at a particular frequency is well known in the art, and further details could be found at the priority date at en.wikipedia.org/wiki/Fresnel_zone.

Figure 6:
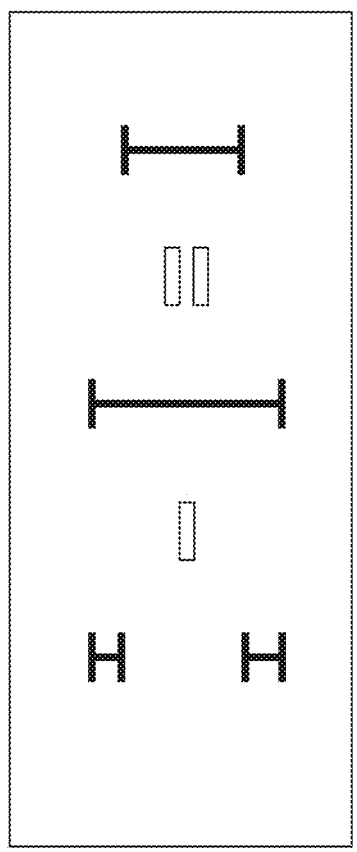

Only if both the virtual rays are clear of the blocking object can it be determined that the blocking object will cause shield diffraction. If one of the virtual rays is blocked by the blocking object 34, then the object will need to be assessed for knife edge diffraction instead, as described previously. However, if it is determined at step 10.10 that the virtual rays are clear of the blocking object and pass to either side, as shown in FIG. 4, then the next step, at step 10.12, is to measure inwards from the edges of the second Fresnel zone in a direction normal to the line of sight to the edges of the object. Such an arrangement is shown in FIG. 5, with the measurements 52 and 54 being determined. The effective width of the blocking object is then determined at step 10.14, as well as the space to either side of the object to the edge of the second Fresnel zone, at step 10.14, as shown in FIG. 6. This effective width, together with the measurements relating to the distance between the edges of the blocking object to edges of the second Fresnel zone can then be used in the link calculations to determine the propagation and signal to noise ratio characteristics of the link.

Illustrative aspects and embodiments described herein are agnostic to specific radio propagation equation, and many different versions of such calculations are already known in the art, which may be used in or with illustrative aspects described herein. That is, aspects described herein can use any such known propagation and link signal to noise ratio calculations. Any of the following illustrative calculations may be used, or may be used to derive the necessary calculations:

Wang et al, *Attenuation by a Human Body and Trees as well as Material Penetration Loss in 26 and 39 GHz Millimeter Wave Bands* International Journal of Antennas and Propagation, Volume 2017 (2017), Article ID 2961090, 8 pages Mitra, A, *Lecture Notes on Mobile Communication, Chapter* 4, available at:
www.iitg.emet.in/scifack/qip/public_html/cd_cell/chapters/a_mitra_mobile_communication/chapter4.pdf Pathak, P. H., *Uniform Geometrical Theory of Diffraction*, available at:
www.dtic.mil/get-tr-doc/pdf?AD=ADP005645

James, G. L., *Geometrical Theory of Diffraction*, IEE, London, 1986

In this respect, within the prior art knife edge diffraction is generally referred to as such and models are provided, whereas for shield diffraction the normal diffraction models used where an object lies fully within the main transmission lobe of an RF field are used.

In summary, therefore, embodiments and aspects described herein provide a computer implemented radio frequency planning tool suitable for planning high frequency mobile network deployments such as a 5G network, which is able to use accurate geospatial data which includes buildings, street furniture, trees and the like accurately positioned and sized, detected by multiple sensing modalities including aerial imagery and LiDAR based point cloud systems which are then integrated together, and which then applies known radio propagation rules to the accurate geospatial data, in order to determine whether a particular link suffers from knife edge diffraction or shield diffraction due to objects in the path of the link. The result is an improved RF propagation map showing signal to noise ratios across a geospatial area, which can be considered to be more accurate and hence give improved reliability than heretofore has been possible.

In a modification to the above described embodiments to provide further embodiments, the propagation models can be further adapted to take into account rainfall in the geographic area which is being modelled. This phenomena is taken into account by an offset value being added into the link budget equations e.g. for either heavy rain or no rain. Rain and sleet are the only two major factors affecting propagation and attenuation, and information on rainfall for a particular region can be obtained from, for example, meteorological data for the area.

Various further modifications, whether by way of addition, deletion, or substitution may be made to above mentioned embodiments to provide further embodiments, any and all of which are intended to be encompassed by the appended claims.

The invention claimed is:

1. A computer-implemented method of simulating a radio frequency (RF) communications link between simulated transmitter and receiver positions, comprising:
    a) obtaining integrated geospatial data pertaining to an area in which the transmitter and receiver positions are to be simulated, the integrated geospatial data including information relating to geospatial objects located in the vicinity of the RF communications link to be simulated, the integrated geospatial data comprising overhead imagery data obtained from an overhead survey of the area integrated with street-level data obtained from a street-level survey of the area, wherein the street-level data comprises street-level topographic data and street-level point cloud data, the street-level point cloud data being derived from geospatial point cloud data obtained from the street-level survey of the area, wherein the street-level point cloud data is integrated with and indexed against the street-level topographic data, and wherein the street-level topographic data and the street-level point cloud data include information relating to street-level geospatial objects, the street-level geospatial objects including street furniture including pole or post mounted street furniture; and
    b) simulating RF communications link propagation characteristics between the simulated transmitter and receiver positions using the integrated geospatial data and an RF propagation model, wherein the RF propagation model is a knife edge diffraction model;
    wherein radio frequencies of the radio frequency (RF) communications link are GHz frequencies; and
    wherein at least one knife edge diffraction value is determined using the knife edge diffraction model for items of the street furniture with at least one vertex within a beamwidth of the RF communications link.

2. A method according to claim 1, wherein the overhead imagery data is derived from one or more of:
    i) aerial imagery data; and/or
    ii) satellite imagery data.

3. A method according to claim 1, wherein the pole or post mounted street furniture includes any one or more of:
    a) lamp-posts;
    b) sign-posts;
    c) post-boxes;
    d) telephone boxes;
    e) fencing;
    f) barriers;
    g) traffic lights;
    h) telegraph poles; and/or
    i) traffic signs.

4. A method according to claim 1, wherein the street-level geospatial objects further includes vegetation, and in particular trees.

5. A method according to claim 1, wherein determining the at least one knife edge diffraction value further comprises:
    i) defining a virtual RF propagation area between the simulated transmitter and receiver positions,
    ii) identifying the items of the street furniture from the integrated geospatial data which possess at least one vertex located within the defined virtual RF propagation area and which extend beyond the defined virtual RF propagation area;
    iii) calculating the at least one knife edge diffraction value for the items of the street furniture and each associated vertex;
    iv) determining from the respective knife edge diffraction values the greatest such value; and
    v) calculating the RF communications link propagation characteristics in dependence on the determined knife edge diffraction value.

6. A method according to claim 5, wherein a size and shape of the defined virtual RF propagation area is determined in dependence on the RF frequency being simulated.

7. A method according to claim 6, wherein the defined virtual RF propagation area is in the shape of an ellipse.

8. A method according to claim 5, wherein the defined virtual RF propagation area corresponds to an area of a 2nd Fresnel zone between the simulated transmitter and receiver positions.

9. A method according to claim 1, wherein the integrated geospatial data further includes data relating to meteorological conditions in the defined virtual RF propagation area.

10. A method according to claim 9, wherein the meteorological conditions include an amount of rainfall in the defined virtual RF propagation area.

11. A system for simulating a radio frequency (RF) communications link between simulated transmitter and receiver positions, the system comprising one or more processors and one or more computer readable storage media storing one or more programs that when executed by the one or more processors cause the processors to simulate a RF communications link between simulated transmitter and receiver positions, the simulating comprising:
  a) obtaining integrated geospatial data pertaining to an area in which the transmitter and receiver positions are to be simulated, the integrated geospatial data including information relating to geospatial objects located in the vicinity of the RF communications link to be simulated, the integrated geospatial data comprising overhead imagery data obtained from an overhead survey of the area integrated with street-level data obtained from a street-level survey of the area, wherein the street-level data comprises street-level topographic data and street-level point cloud data, the street-level point cloud data being derived from geospatial point cloud data obtained from the street-level survey of the area, wherein the street-level point cloud data is integrated with and indexed against the street-level topographic data, and wherein data topographic and the street-level point cloud data include information relating to street-level geospatial objects, the street-level geospatial objects including street furniture including pole or post mounted street furniture; and
  b) simulating RF communications link propagation characteristics between the simulated transmitter and receiver positions using the integrated geospatial data and an RF propagation model, wherein the RF propagation model is a knife edge diffraction model;
  wherein radio frequencies of the radio frequency (RF) communications link are GHz frequencies; and
  wherein at least one knife edge diffraction value is determined using the knife edge diffraction model for items of the street furniture with at least one vertex within a beamwidth of the RF communications link.

12. The system of claim 11, wherein determining the at least one knife edge diffraction value further comprises:
  i) defining a virtual RF propagation area between the simulated transmitter and receiver positions,
  ii) identifying the items of the street furniture from the integrated geospatial data which possess at least one vertex located within the defined virtual RF propagation area and which extend beyond the defined virtual RF propagation area;
  iii) calculating the at least one knife edge diffraction value for the items of the street furniture and each associated vertex;
  iv) determining from the respective knife edge diffraction values the greatest such value; and
  v) calculating the RF communications link propagation characteristics in dependence on the greatest knife edge diffraction value.

13. One or more nontransitory computer readable media storing computer executable instructions that, when executed, cause a data processing system to simulate a radio frequency (RF) communications link between simulated transmitter and receiver positions, the simulating comprising:
  a) obtaining integrated geospatial data pertaining to an area in which the transmitter and receiver positions are to be simulated, the integrated geospatial data including information relating to geospatial objects located in the vicinity of the RF communications link to be simulated, the integrated geospatial data comprising overhead imagery data obtained from an overhead survey of the area integrated with street-level data obtained from a street-level survey of the area, wherein the street-level data comprises street-level topographic data and street-level point cloud data, the street-level point cloud data being derived from geospatial point cloud data obtained from the street-level survey of the area, wherein the street-level point cloud data is integrated with and indexed against the street-level topographic data, and wherein data topographic and the street-level point cloud data include information relating to street-level geospatial objects, the street-level geospatial objects including street furniture including pole or post mounted street furniture; and
  b) simulating RF communications link propagation characteristics between the simulated transmitter and receiver positions using the integrated geospatial data and an RF propagation model;
  wherein radio frequencies of the radio frequency (RF) communications link are GHz frequencies; and
  wherein at least one knife edge diffraction value is determined using a knife edge diffraction model for items of the street furniture with at least one vertex within a beamwidth of the RF communications link.

14. A computer-implemented method of simulating a radio frequency (RF) communications link between simulated transmitter and receiver positions, comprising:
  a) obtaining integrated geospatial data pertaining to an area in which the transmitter and receiver positions are to be simulated, the integrated geospatial data including information relating to geospatial objects located in the vicinity of the RF communications link to be simulated, the integrated geospatial data comprising overhead imagery data obtained from an overhead survey of the area integrated with street-level data obtained from a street-level survey of the area, wherein the street-level data comprises street-level topographic data and street-level point cloud data, the street- level point cloud data being derived from geo-spatial point cloud data obtained from the street-level survey of the area, wherein the street-level point cloud data is integrated with and indexed against the street-level topographic data, and wherein the street-level topographic data and the street-level point cloud data include information relating to street-level geospatial objects, the street-level geospatial objects including street furniture including pole or post mounted street furniture; and
  b) simulating RF communications link propagation characteristics between the simulated transmitter and receiver positions using the integrated geospatial data and an RF propagation model, wherein the RF propagation model is a shield diffraction model;
  wherein radio frequencies of the radio frequency (RF) communications link are GHz frequencies; and
  wherein at least one shield diffraction value is determined using the shield diffraction model for items of the street furniture wholly within a beamwidth of the RF communications link.

15. A method according to claim 14, wherein determining the at least one shield diffraction value further comprises:
   i) defining a virtual RF propagation area between the simulated transmitter and receiver positions,
   ii) identifying any objects from the integrated geospatial data which are located on a simulated line of sight between the simulated transmitter and receiver positions;
   iii) determining if any of the identified objects are located wholly within the defined virtual RF propagation area;
   iv) for any object determined to be wholly within the defined virtual RF propagation area, calculating the shield diffraction value for the objects thus determined; and
   v) calculating the RF communications link propagation characteristics in dependence on the greatest calculated shield diffraction value.

16. A method according to claim 15, wherein a size and shape of the defined virtual RF propagation area is determined in dependence on the RF frequency being simulated.

17. A method according to claim 16, wherein the defined virtual RF propagation area is in the shape of an ellipse.

18. A method according to claim 15, wherein the defined virtual RF propagation area corresponds to an area of a 2nd Fresnel zone between the simulated transmitter and receiver positions.

19. A system for simulating a radio frequency (RF) communications link between simulated transmitter and receiver positions, the system comprising one or more processors and one or more computer readable storage media storing one or more programs that when executed by the one or more processors cause the processors to simulate a RF communications link between simulated transmitter and receiver positions, the simulating comprising:

a) obtaining integrated geospatial data pertaining to an area in which the transmitter and receiver positions are to be simulated, the integrated geospatial data including information relating to geospatial objects located in the vicinity of the RF communications link to be simulated, the integrated geospatial data comprising overhead imagery data obtained from an overhead survey of the area integrated with street-level data obtained from a street-level survey of the area, wherein the street-level data comprises street-level topographic data and street-level point cloud data, the street-level point cloud data being derived from geospatial point cloud data obtained from the street-level survey of the area, wherein the street-level point cloud data is integrated with and indexed against the street-level topographic data, and wherein the street-level topographic data and the street-level point cloud data include information relating to street-level geospatial objects, the street-level geospatial objects including street furniture including pole or post mounted street furniture; and b) simulating RF communications link propagation characteristics between the simulated transmitter and receiver positions using the integrated geospatial data and an RF propagation model, wherein the RF propagation model is a shield diffraction model;

wherein radio frequencies of the radio frequency (RF) communications link are GHz frequencies; and wherein at least one shield diffraction value is determined using the shield diffraction model for items of the street furniture wholly within a beamwidth of the RF communications link.

* * * * *